UNITED STATES PATENT OFFICE.

SALLY SCHIFF, OF KARLSRUHE, GERMANY.

DENTAL CEMENT.

1,408,960.     Specification of Letters Patent.     Patented Mar. 7, 1922.

No Drawing.     Application filed July 9, 1920. Serial No. 395,074.

*To all whom it may concern:*

Be it known that I, SALLY SCHIFF, chemist, a citizen of Germany, and resident of Karlsruhe, Baden, Germany, with the post-office address 15 Ettlingerstrasse, have invented new and useful Improvements in Dental Cements, (for which I have filed applications in Germany May 5, 1917, application No. 51,370, with priority of June 12, 1918, application No. 54,384; Austria June 11, 1919; Hungary July 8, 1919; Switzerland June 12, 1919; Netherlands June 18, 1919; Sweden June 12, 1919; Denmark July 14, 1919; Belgium June 25, 1919; France June 26, 1919; Czecho-Slovakia Aug. 19, 1919,) of which the following is a specification.

For filling teeth there are used masses made by mixing a powder with a liquid, the composition being such that it hardens to a solid cement.

According to the chemical composition of the powder or the liquid such fillings may be classified under five groups as follows:—

(1) Zinc chloride cements, in which the powder consists essentially of zinc oxide and the liquid of an aqueous zinc chloride solution.

(2) Zinc sulphate cements, in which the powder again consists of zinc oxide and the liquid of zinc sulphate solution.

(3) Zinc oxide phosphate cements, in which the powder consists of a zinc oxide and the liquid of a solution of a phosphoric acid or a phosphate.

In these three groups there is formed by bringing together the powder and the liquid a double compound which hardens.

(4) Silicate cements. This title is not quite correct. The group does not contain cements in which silicic acid takes part in a reaction on bringing together a powder and a liquid, as in the case of the materials comprised in the foregoing groups. The masses known as silicate cements are actually phosphate cements, which, however, in respect of the composition of the powder differ from the cements of the third group in that zinc oxide is not the powder used, but primarily silicates and polysilicates, and also oxides of sodium, potassium, lithium, calcium, magnesium, strontium, aluminium, zinc and beryllium, and further borates, phosphates, tungstates and molybdates of the foregoing metals. These powders form with the phosphoric acids and their acid salts in dissolved state plastic masses which harden after a short time but having hardened continue for some time longer to eliminate acid.

This elimination of acid is a considerable hindrance to the use of these fillings, since it gives rise to injury of the pulp. In order to prevent this a substratum of basic zinc oxide compounds must be given to the filling. The elimination of acid is to be explained by the fact that there is no chemical union of the phosphoric acid but only an adsorption thereof.

As already stated, in the silicate cements, the silicic acid does not enter into reaction. Indeed it is already combined with a metal oxide.

(5) Porcelain and glass fillings. These are included here only for the sake of completeness. They differ from the first four groups in that they are not produced by bringing together a powder and a liquid, but are made by a melting process, just as glass and porcelain are made, and are cemented into the hollow tooth after cooling.

For increasing the hardness, silica and powdered glass, as well as powdered porcelain-like masses produced by fusion, have been added to the first four groups, but merely to increase the hardness of the mixture, just as the gravel added to concrete increases the mechanical hardness.

The disadvantage of the silica added to a certain extent in combined condition, is that it is not transparent and therefore the cement has an undesirable appearance.

The present invention is based on the observation that the use of silicic acid in colloidal condition, that is to say as hydrate, not as $SiO_2$, gives rise to a number of considerable advantages in the manufacture of dental cements. In this connection the first four of the above groups come into question.

It has been found that colloidal silicic acid lends to the hardened cement a transparent appearance and that the hardness is advantageously affected.

An important part is played by the colloidal silicic acid, however, in cases in which phosphoric acid or an acid phosphate is used in making the cement; it will be remembered that in these cases there is the undesirable result that acid is eliminated after the hardening.

It has been found that in these cements the phosphoric acid may be fixed by entering into reaction with the active silicic forming compounds, such as those which phosphoric acid makes with molybdic acid. The compound is formed apparently in accordance with the equation:—

$$x.H_4SiO_4 + y.H_3PO_4 = (H_4SiO_4.H_3PO_4).xy-n+n.H_2O$$

This polysilicophosphoric acid and the known powders, such as have been named above, form the silicate cements, i. e., compounds which do not eliminate acid and, owing to their great hardness, exhibit a high stability in presence of alkaline as well as acid liquids.

According to the composition of the powder cements of high transparency may be obtained.

The colloidal silicic acid may be used as sol, hydrogel, acetogel or alcogel. It may either be added to the powder and the latter then mixed with a solution of phosphoric acid, or the powder (oxides, silicates, polysilicates) may be treated with a colloidal solution of the silicic acid in phosphoric acid or an acid phosphate. Again colloidal silicic acid may be added either to the powder or to the liquid. It is also practicable to use as the liquid an emulsoid or suspensoid of phosphoric acid or an acid salt thereof with hydrogel, acetogel or alcogel of silicic acid. If necessary, colouring matter may be added.

When colloidal silicic acid is used not for the purpose of fixing free acid but only for enhancing the transparency and hardness of the mass, it may be applied in combination with acids, salts or bases, but also without these, that is to say only with metal oxides or the like.

It may be stated, for example, that gelatinous hydrates of silicon dioxide, that is to say colloidal silicic acid, dissolve in solutions of tungstates and silicotungstates; moreover, if the acetogel of silicic acid be used, it is possible to use at the same time any other suitable acid which may displace the water in the hydrogel. Again, the water in the hydrogel may serve as solvent for particular salts. For instance, boric acid, molybdic acid or tungstic acid may be dissolved in hydrogel, or magnesium chloride, zinc chloride, zinc sulphate or the like.

These compounds and suspensoids and emulsoids of silicic acid, and also phosphoric acid in combination with silicic acid, may be used alone for making cements.

The following examples illustrates the invention:—

*Example I.*—Addition of colloidal silicic acid to the powder.

80 grams of magnesium sulphate and 200 grams of aluminium sulphate are dissolved in water and 100 grams of sodium silicate in aqueous solution are added. The mixture is then neutralized with caustic soda lye, phenolphthalein being the indicator.

150 grams of silicic acid hydrogel (containing 70 per cent of water) are added. The mass is washed and brought to the consistency of paste by pressing out the water. The product is used as a paste.

*Example II.*—Addition of colloidal silicic acid to the liquid.

(a). 32 grams of aluminium hydroxide are intimately mixed with 20 grams of silicic acid acetogel and 150 grams of water, and the mixture further mixed with 180 grams of pyrophosphoric acid. By strongly heating a clear solution is obtained.

(b) To this clear solution are added 50 grams of the acetogel (50 per cent acid content) and the whole is ground in a ball-mill for three hours (suspensoid).

*Example III.*—Addition of colloidal silicic acid to the powder and liquid.

(a) *Powder.* 20 grams of crystallized sodium silicate are ground wet with 3.5 grams of calcium hydroxide, and 15 grams of aluminium silicate, and the mixture is dried and heated to incandescence.

The powder obtained is intimately mixed with sufficient alcogel of silicic acid to produce a stiff paste.

(b) *Liquid.* 16 grams of acid aluminium phosphate are most intimately ground in a ball-mill with 4 grams of water, and 6 grams of silicic acid acetogel (50 per cent acid content).

*Example IV.*—

(a) *Powder.* 200 grams of zinc oxide and 4 grams of borax.

(b) *Liquid.* 50 grams of silicic acid gel saturated with zinc chloride.

*Example V.*—

(a) *Powder.* 100 grams of magnesia heated quickly to incandescence.

(b) *Liquid.* 50 grams of silicic acid gel saturated with magnesium chloride.

Having thus fully described the nature of the said invention and the best means I know of carrying the same into practical effect, I claim:—

1. The improvement in the process of making dental cements made by bringing together pulverulent metallic compounds and liquids capable of producing dental cements, which comprises adding silicic acid in colloidal condition.

2. The improvement in the process of making dental cements made by bringing together pulverulent metallic compounds and liquids capable of producing dental cements, which comprises adding silicic acid in colloidal condition to the liquid.

3. The improvement in the process of making dental cements made by bringing together pulverulent metallic compounds and liquids capable of producing dental cements, which comprises adding silicic acid as a gel.

4. The improvement in the process of making dental cements made by bringing together pulverulent metallic compounds and a liquid capable of producing dental cements, which comprises adding silicic acid as an acetogel.

5. The process of making dental cements consisting in bringing together pulverulent aluminum compounds containing oxygen with liquids capable of producing dental cements with said compounds and adding silicic acid in colloidal condition.

6. The improvement in the process of making dental cements made by bringing together aluminum silicates and liquids capable of producing dental cements with said aluminum silicates, which comprises adding silicic acid in colloidal condition.

7. The process of making dental cements consisting in bringing together pulverulent aluminum potassium silicate with liquids capable of producing dental cements with said aluminum potassium silicate and adding silicic acid in colloidal condition.

8. The process of making dental cements consisting in bringing together pulverulent metallic compounds capable of forming a solid compound comprising a silico phosphate salt and phosphoric compounds containing oxygen and adding silicic acid in colloidal condition.

9. The process of making dental cements consisting in bringing together pulverulent metallic compounds capable of forming a solid compound comprising a silico phosphate salt and a phosphoric acid and adding silicic acid in colloidal condition.

10. The process of making dental cements consisting in bringing together pulverulent metallic compounds capable of forming a solid compound comprising a silico phosphate salt and orthophosphoric acid and adding silicic acid in colloidal condition.

11. The process of making dental cements consisting in bringing together pulverulent metallic compounds capable of forming a solid compound comprising a silico phosphate salt and phosphoric compounds containing oxygen and adding a gel of silicic acid in the form of an emulsoid.

12. The process of making dental cements consisting in bringing together pulverulent aluminum potassium silicate with orthophosphoric acid and adding an acetogel of silicic acid in the form of an emulsoid.

In testimony, that I claim the foregoing as my invention, I have signed my name this eleventh day of May, 1920.

SALLY SCHIFF.